United States Patent [19]
Capurso

[11] Patent Number: 5,918,079
[45] Date of Patent: Jun. 29, 1999

[54] MOVABLE FLASH WITH BUILT-IN ACTUATOR FOR SHUTTER RELEASE BUTTON IN COMPACT CAMERA

[75] Inventor: Robert G. Capurso, Bergen, N.Y.

[73] Assignee: Eastman Kodak Company, Rochester, N.Y.

[21] Appl. No.: 09/078,121

[22] Filed: May 13, 1998

[51] Int. Cl.⁶ .......................... G03B 15/03; G03B 17/38; H04N 5/225
[52] U.S. Cl. .......................... 396/178; 396/502; 348/375
[58] Field of Search ........................ 396/155, 175, 396/176, 177, 178, 263, 266, 435, 502, 535; 348/207, 371, 373, 375; 358/909.1, 906; 362/3, 18

[56] References Cited

U.S. PATENT DOCUMENTS

| | | | |
|---|---|---|---|
| 4,106,037 | 8/1978 | Nakamura et al. | 396/178 |
| 4,557,571 | 12/1985 | Reibi | 396/178 |
| 4,954,858 | 9/1990 | Ohmura et al. | 396/180 |
| 5,036,345 | 7/1991 | Kawano | 396/178 X |
| 5,126,772 | 6/1992 | Albrecht | 396/26 |
| 5,276,474 | 1/1994 | Dassero | 396/178 |
| 5,436,686 | 7/1995 | Walsh | 396/535 |
| 5,664,248 | 9/1997 | Naka et al. | 396/503 |

*Primary Examiner*—Safet Metjahic
*Assistant Examiner*—J. K. Han
*Attorney, Agent, or Firm*—Roger A. Fields

[57] ABSTRACT

A compact camera including a housing, a manually depressible shutter release button, and a movable flash supported for movement between a folded position against the housing and covering the shutter release button and an unfolded position extending from the housing and not covering the shutter release button, is characterized in that the movable flash has a built-in actuator for the shutter release button which covers the shutter release button when the movable flash is in its folded position, but can be manually depressed sufficiently to similarly depress the shutter release button.

6 Claims, 2 Drawing Sheets

MOVABLE FLASH WITH BUILT-IN ACTUATOR FOR SHUTTER RELEASE BUTTON IN COMPACT CAMERA

CROSS REFERENCE TO RELATED APPLICATIONS

Reference is made to commonly assigned copending applications Ser. No. 09/078,126, entitled PIVOTAL FLASH WITH PIVOT ACTUATOR IN COMPACT CAMERA and filed May 13, 1998 in the name of Robert G. Capurso, and Ser. No. 09/078,068, entitled MULTI-POSITION FLASH WITH SHUTTER ACTUATOR OPERABLE IN EACH POSITION ON COMPACT CAMERA and filed May 13, 1998 in the name of Robert G. Capurso.

FIELD OF THE INVENTION

The invention relates generally to the field of photography, and in particular to a compact camera with a movable flash that can be moved between folded and unfolded positions.

BACKGROUND OF THE INVENTION

Commonly assigned prior art U.S. Pat. No. 5,276,474 issued Jan. 4, 1994 discloses a compact camera comprising a housing, a manually depressible shutter release button, and a movable flash supported for movement between a folded position against the housing and covering the shutter release button and an unfolded position extending from the housing and not covering the shutter release button. The movable flash must be in its unfolded position to use the shutter release button. This can be a disadvantage.

The Cross-Referenced Applications

Cross-referenced application Ser. No. 09/078,126 discloses a compact camera comprising a housing, and a pivotal flash that can be pivoted between a folded position against the housing and an unfolded position extending from the housing. The housing has a pair of elongate surfaces that come together to define a corner portion. The pivotal flash is pivotally supported beneath the corner portion and has a pivot actuator that is located to be swung around the corner position from over one of the surfaces to over the other surface in order to pivot the pivotal flash from the folded position to the unfolded position.

Cross-referenced application Ser. No. 09/078,068 discloses a camera comprising a housing, a dual position flash pivotable between a folded position against the housing and an unfolded position extending from the housing, a taking lens, a shutter blade movable to momentarily uncover the taking lens in order to take a picture, and a shutter actuator manually depressible to initiate movement of the shutter blade. The shutter actuator is located on the flash to be pivoted with the flash and is manually depressible in the folded and unfolded positions of the flash to initiate movement of the shutter blade in each one of the positions.

SUMMARY OF THE INVENTION

A compact camera comprising a housing, a manually depressible shutter release button, and a movable flash supported for movement between a folded position against the housing and covering the shutter release button and an unfolded position extending from the housing and not covering the shutter release button, is characterized in that:

the movable flash has a built-in actuator for the shutter release button which covers the shutter release button when the movable flash is in its folded position, but can be manually depressed sufficiently to similarly depress the shutter release button.

Preferably, the movable flash has a relatively thin wall which is a single piece with the actuator and includes a slit that is located alongside the actuator to permit the actuator to be manually depressed to similarly depress the shutter release button.

DETAILED DESCRIPTION OF THE INVENTION

Figure 1:
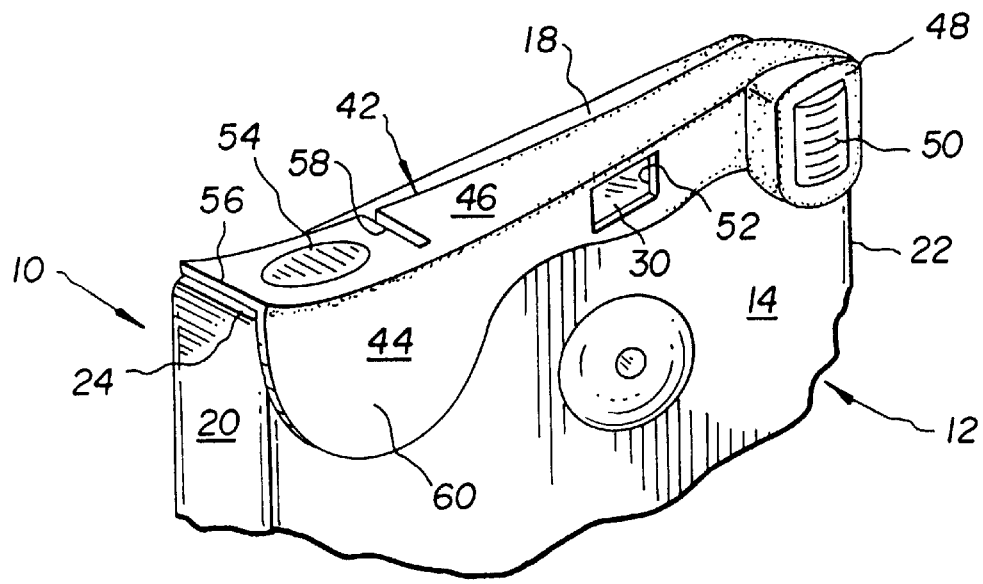
FIG. 1 is a top front perspective view of a compact camera with a movable flash according to a preferred embodiment of the invention, showing the movable flash in a folded position.

The invention is disclosed as being embodied preferably in a compact camera with a flip-up flash. Because the features of a compact camera with a flip-up flash are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a compact camera 10 including a housing 12 provided with front and rear elongate surfaces 14 and 16, a top elongate surface 18, and side or end elongate surfaces 20 and 22. The top surface 18 and the side surface 20 come together to define one corner portion 24 of the housing 12. The top surface 18 and the side surface 22 come together to define another, opposite corner portion 26 of the housing 12. The front surface 14 has a front viewfinder opening 28 for a front viewfinder lens 30 and has a front lens opening 32 for a taking lens 34. The rear surface 16 has a rear viewfinder opening 36 for a rear viewfinder lens 38. One looks through the front and rear viewfinder lenses 30 and 38 to frame a subject to be photographed.

A known type shutter release button 40 protrudes from a hole (not shown) in the top surface 18 of the housing 12, proximate the corner portion 24 of the housing. See FIGS. 2 and 3. The shutter release button 40 is manually depressible to initiate picture-taking.

As shown in FIGS. 1–4, a pivotal electronic flash 42 includes a relatively thin front wall 44 that is similar in shape to the front surface 14 of the housing 12, a relatively thin top/side wall 46 that is substantially perpendicular to the front wall and is similar in shape to the top surface 18 of the housing, and a flash emission head 48 having a flash emission lens 50. The front wall 44 of the pivotal flash 42 has a front viewfinder opening 52. The top/side wall 46 of the pivotal flash 42 has an integral button actuator 54 for the shutter release button 40 and a slightly curved end portion that serves as a pivot actuator 56. A slit 58 is cut in the top/side wall 46, alongside the button actuator 54, to permit the button actuator to be manually depressed and to resiliently recover its original shape when released.

Figure 2:
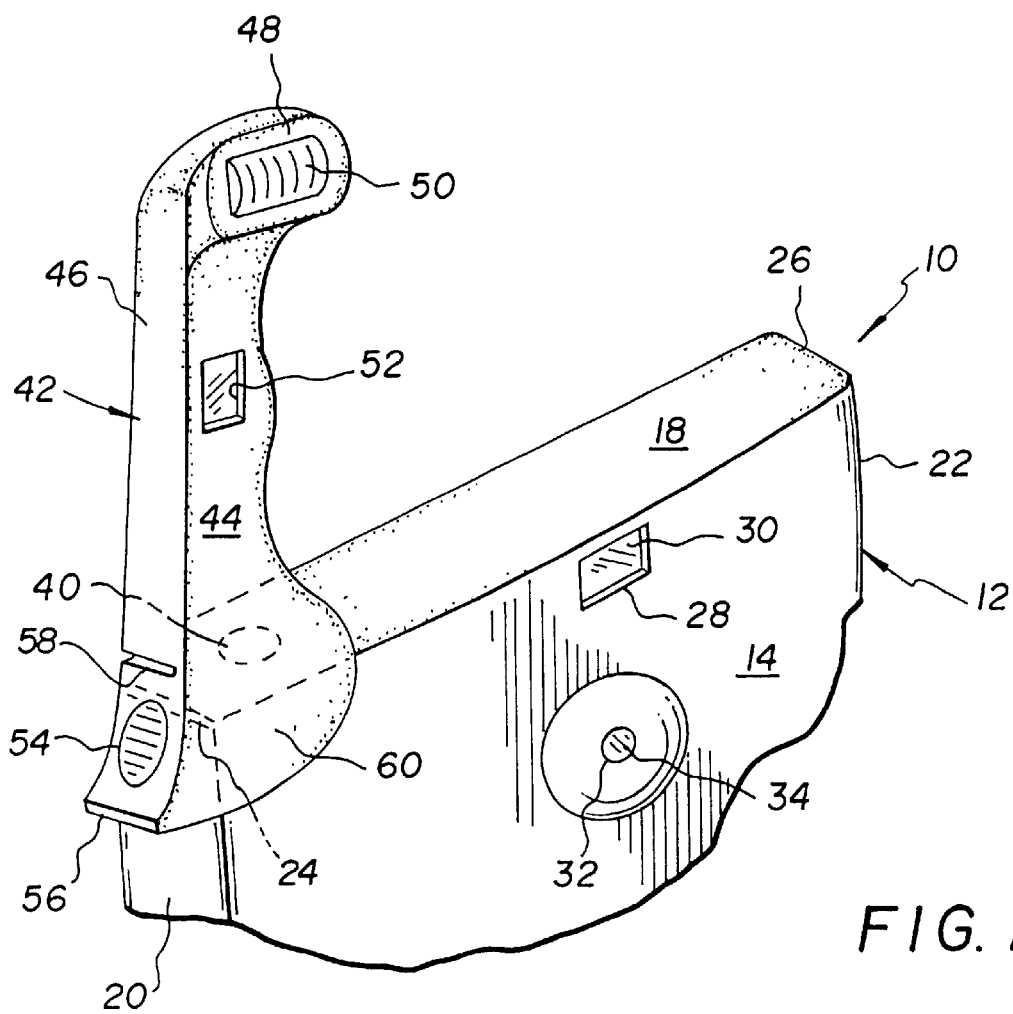
FIG. 2 is a top front perspective view of the compact camera, showing the movable flash in an unfolded position.
Figure 3:
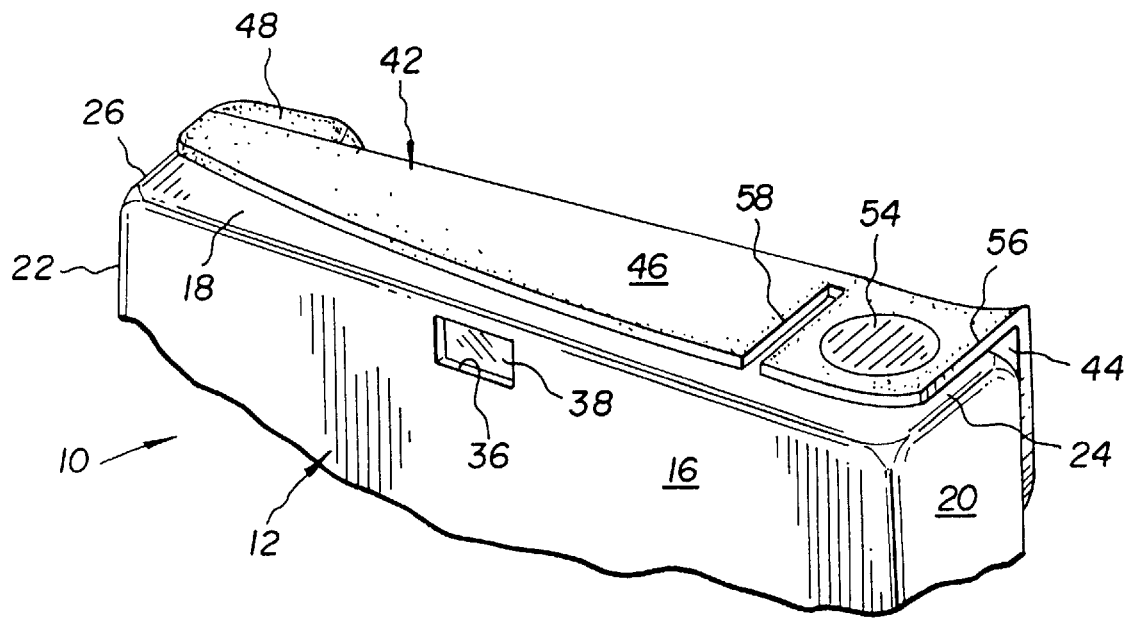
FIG. 3 is a top rear perspective view of the compact camera, showing the movable flash in its folded position.
Figure 4:
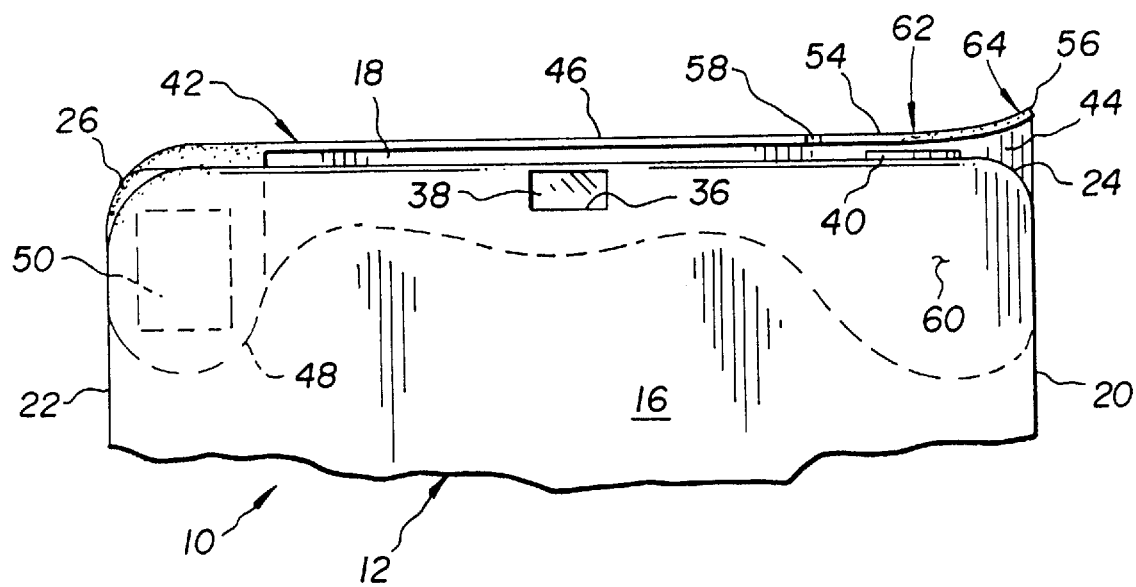
FIG. 4 is a rear elevation view of the compact camera, showing the movable flash in its folded position.

A pivot pin 60 pivotally supports the pivotal flash 42, beneath the corner portion 24 of the housing 12, for pivotal movement between a folded position shown in FIGS. 1, 3 and 4 and an unfolded position shown in FIG. 2. In the folded position, the front viewfinder opening 52 in the front wall 44 of the pivotal flash 42 is over the front viewfinder opening 28 in the front surface 14 of the housing 12, the flash emission head 48 is located adjacent the corner portion 26 of the housing, the button actuator 54 is atop the shutter release button 40, and the pivot actuator 56 is gradually inclined away from the corner portion 24 of the housing to create an increasing space between the pivot actuator and that corner portion. The button actuator 54 can be manually depressed as indicated by the arrow 62 in FIG. 4, to similarly depress the shutter release button 40. In the unfolded position, the pivotal flash 42 stands erect with the flash emission head 48 elevated from the corner portion 24 of the housing 12. To pivot the pivotal flash 42 from the folded position to the unfolded position, the pivot actuator 56 can be manually depressed as indicated by the arrow 64 in FIG. 4, to swing the pivot actuator around the corner portion 24 of the housing 12 from over the top surface 18 of the housing to over the side surface 20 of the housing.

The invention has been described with reference to a preferred embodiment. However, it will be appreciated that variations and modifications can be effected by a person of ordinary skill in the art without departing from the scope of the invention.

PARTS LIST 10. compact camera
12. housing
14. front elongate surface
16. rear elongate surface
18. top elongate surface
20. side elongate surface
22. side elongate surface
24. corner portion
26. corner portion
28. front viewfinder opening
30. front viewfinder lens
32. front lens opening
34. taking lens
36. rear viewfinder opening
38. rear viewfinder lens
40. shutter release button
42. pivotal flash
44. front wall
46. top/side wall
48. flash emission head
50. flash emission lens
52. front viewfinder opening
54. button actuator
56. pivot actuator
58. slit
60. pivot pin
62. arrow
64. arrow

What is claimed is:

1. A compact camera comprising a housing, a manually depressible shutter release button, and a movable flash supported for movement between a folded position against said housing and covering said shutter release button and an unfolded position extending from the housing and not covering the shutter release button, is characterized in that:

said movable flash has a built-in actuator for said shutter release button which covers the shutter release button when the movable flash is in its folded position, but can be manually depressed sufficiently to similarly depress the shutter release button.

2. A compact camera as recited in claim 1, wherein said housing has a front viewfinder opening, and said movable flash has a front viewfinder opening that is located over said front viewfinder opening of said housing when the movable flash is in its folded position, in order to permit one to look through said front viewfinder opening of said housing when said movable flash is in its folded position.

3. A compact camera as recited in claim 2, wherein said housing has a top surface at which said shutter release button is located and a front surface in which said front viewfinder opening of the housing is formed, and said movable flash has one relatively thin wall which includes said actuator and is similar in shape to said top surface of said housing and another relatively thin wall which includes said front viewfinder opening of the movable flash and is similar in shape to said front surface of the housing.

4. A compact camera as recited in claim 3, wherein said actuator and said wall of said movable flash that includes the actuator are a single piece which includes a slit in the wall that is located alongside the actuator to permit the actuator to be manually depressed to similarly depress said shutter release button.

5. A compact camera as recited in claim 1, wherein said movable flash has a relatively thin wall which is a single piece with said actuator and includes a slit that is located alongside the actuator to permit the actuator to be manually depressed to similarly depress said shutter release button.

6. A compact camera as recited in claim 1, wherein said housing has a pair of opposite corner end portions, said shutter release button is located proximate a first one of said corner end portions, and said movable flash is pivotally supported beneath said first one of said corner end portions and includes a flash emission head that is located adjacent a second one of said corner end portions when the movable flash in its folded position and is elevated from said first one of the corner end portions when the movable flash is in its unfolded position.

\* \* \* \* \*